United States Patent
Jin et al.

(10) Patent No.: US 11,704,460 B2
(45) Date of Patent: Jul. 18, 2023

(54) SYSTEM AND METHOD FOR FAST AND ACCURATE NETLIST TO RTL REVERSE ENGINEERING

(71) Applicants: University of Florida Research Foundation, Incorporated, Gainesville, FL (US); University of Central Florida Research Foundation, Inc., Orlando, FL (US)

(72) Inventors: Yier Jin, Gainesville, FL (US); Shaojie Zhang, Orlando, FL (US); James Geist, Oviedo, FL (US); Travis Meade, Orlando, FL (US); Jason Liam Portillo, San Jose, CA (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 99 days.

(21) Appl. No.: 17/343,231

(22) Filed: Jun. 9, 2021

(65) Prior Publication Data
US 2021/0390236 A1    Dec. 16, 2021

Related U.S. Application Data

(60) Provisional application No. 63/037,073, filed on Jun. 10, 2020.

(51) Int. Cl.
G06F 30/33 (2020.01)
G06F 30/327 (2020.01)
G06F 115/08 (2020.01)

(52) U.S. Cl.
CPC .......... *G06F 30/33* (2020.01); *G06F 30/327* (2020.01); *G06F 2115/08* (2020.01)

(58) Field of Classification Search
USPC ........................................... 716/103
See application file for complete search history.

(56) References Cited

U.S. PATENT DOCUMENTS

| | | | |
|---|---|---|---|
| 2007/0299668 A1* | 12/2007 | Allauzen | G06F 40/289 704/E15.001 |
| 2012/0192163 A1* | 7/2012 | Glendenning | G06F 9/4498 717/146 |
| 2017/0154033 A1* | 6/2017 | Lee | G06F 40/274 |
| 2019/0043503 A1* | 2/2019 | Bauer | G10L 15/02 |
| 2021/0390236 A1* | 12/2021 | Jin | G06F 30/33 |

* cited by examiner

Primary Examiner — Mohammed Alam
(74) Attorney, Agent, or Firm — Alston & Bird LLP

(57) ABSTRACT

Embodiments herein provide for reverse engineering of integrated circuits (ICs) for design verification. In example embodiments, an apparatus receives a gate-level netlist for an integrated circuit (IC), generates a list of equivalence classes related to signals included in the gate-level netlist, determines control signals of the gate-level netlist based at least in part on the list of equivalence classes, determines a logic flow of a finite state transducer (FST) based at least in part on the control signals, and generates register transfer level (RTL) source code for the IC based on the FST.

18 Claims, 15 Drawing Sheets

Algorithm 1 Returns a set of output signals for a given Logic word, $W$, and the netlist, $N$, as a signal graph

```
 1: function FINDOUTPUT(W, N)
 2:     N' is the reverse signal graph of N
 3:     N_s is a signal graph where registers in N are split into input/output
        nodes
 4:     N'_s is a signal graph where registers in N' are split into input/output
        nodes
 5:     Add a root and FSTroot node to N_s
 6:     Add a root and FSTroot node to N'_s
 7:     for r ∈ register set of N do
 8:         if r is from W then
 9:             Add Edge from FSTroot to r's output Node in N_s
10:             Add Edge from FSTroot to r's input Node in N'_s
11:         else
12:             Add Edge from root to r's output Node in N_s
13:             Add Edge from root to r's input Node in N'_s
14:         end if
15:     end for
16:     Connect root to FSTroot in both N_s and N'_s
17:     DT is the Dominator Tree of N_s where the root is root
18:     DT' is the Dominator Tree of N'_s where the root is root
19:     BFS over nodes dominated by FSTroot in DT
20:     output is an empty set that will contain the output signals
21:     for u ∈ BFS do
22:         for x in u's fanout do
23:             Determine reachability of x via Euler Tour Technique on DT
24:             if x not dominated by FSTroot in either DT/DT' then
25:                 Add u to output
26:             end if
27:         end for
28:     end for
29:     return output
30: end function
```

---
Algorithm 1 Compute equivalence classes
---
```
function relic-fun(signals, target − size)
    classes ← []
    for s ∈ signals do
        sl ← slice(s, target − size)
        found ← false
        for cl ∈ classes do
            t ← cl.first
            if ttequal(sl, t) and not found then
                add(cl, sl)
                found ← true
            end if
        end for
        if not found then
            newset ← set(sl)
            add(classes, newset)
        end if
    end for
    sort(classes, λx : x.size)
```
---

FIG. 14

```
Algorithm 2 Test functional equality
  function ttequals(A, B)
    if |A.inputs| ≠ |B.inputs| then
      return false
    end if
    for p ∈ permutations(|A.inputs|) do
      match ← true
      for i ∈ combinations({0, 1}, |A.inputs|) do
        if A(i) ≠ B(p(i)) then
          match ← false
        end if
      end for
      if match then
        return true
      end if
    end for
    return false
```

SYSTEM AND METHOD FOR FAST AND ACCURATE NETLIST TO RTL REVERSE ENGINEERING

CROSS-REFERENCE TO RELATED APPLICATIONS

The present application claims priority to U.S. Provisional Application Ser. No. 63/037,073, titled "SYSTEM AND METHOD FOR FAST AND ACCURATE NETLIST TO RTL REVERSE ENGINEERING," filed Jun. 10, 2020, the contents of which are incorporated herein by reference in their entirety.

GOVERNMENT SUPPORT

This invention was made with government support under 1812071 awarded by National Science Foundation. The government has certain rights in the invention.

TECHNICAL FIELD

The present application relates to the technical field of integrated circuits. In particular, the disclosure relates to reverse engineering of integrated circuits for design verification.

BACKGROUND

To reduce the time-to-market and/or cost of System on Chip (SoC) production, third-party semiconductor cores such as Intellectual Property (IP) cores are often employed as a component of a SoC. However, it is difficult to guarantee performance of third-party semiconductor cores in a SoC. For example, performance of a SoC can be compromised when employing third-party semiconductor cores in the SoC if high-level design specifications for the third-party semiconductor cores are not provided, if the third-party semiconductor cores are delivered as hard IP cores, etc. Failure and/or reduced performance of a third-party semiconductor core can due to flaws and/or vulnerabilities of the third-party semiconductor core such as a hardware Trojan, undocumented back door logic, debugging logic, a weak specification with undefined behavior, etc. A SoC with a flawed third-party semiconductor core can be detrimental to the operation of a computing task and/or a computing system. Moreover, when the flaw is triggered, debugging a system to determine which third-party semiconductor core is flawed and/or designing a solution to the flaw can be more costly and less effective than replacing the flawed third-party semiconductor core with another semiconductor core.

In order to minimize likelihood of failure and/or reduced performance of a third-party semiconductor core, certain techniques can be employed such as, for example, split manufacturing, camouflaging, and functional locking. However, these techniques generally rely on access to high-level design specifications for the third-party semiconductor cores and an ability to modify the way in which cells (e.g., sub-circuits) are placed and/or routed in the third-party semiconductor cores. Often times, such information is not available during design and/or production of a SoC that employs third-party semiconductor cores. Furthermore, certain techniques may utilize side channel analysis to check for abnormal behavior of a third-party semiconductor core. However, side channel analysis generally requires a golden reference model (e.g., a golden reference model that is generally not available) to generate correct input-output correspondence for a third-party semiconductor core. Other techniques also generally require early design data for third-party semiconductor cores and generally make assumptions about design and/or a design process for third-party semiconductor cores that may not be correct.

BRIEF DESCRIPTION OF THE DRAWINGS

Reference will now be made to the accompanying drawings, which are not necessarily drawn to scale, and wherein:

FIG. 7 illustrates an algorithm for output signal detection by leveraging dominator trees, according to various embodiments of the present disclosure;

FIG. 14 illustrates an algorithm for computing equivalence classes, according to various embodiments of the present disclosure.

DETAILED DESCRIPTION

Figure 1:
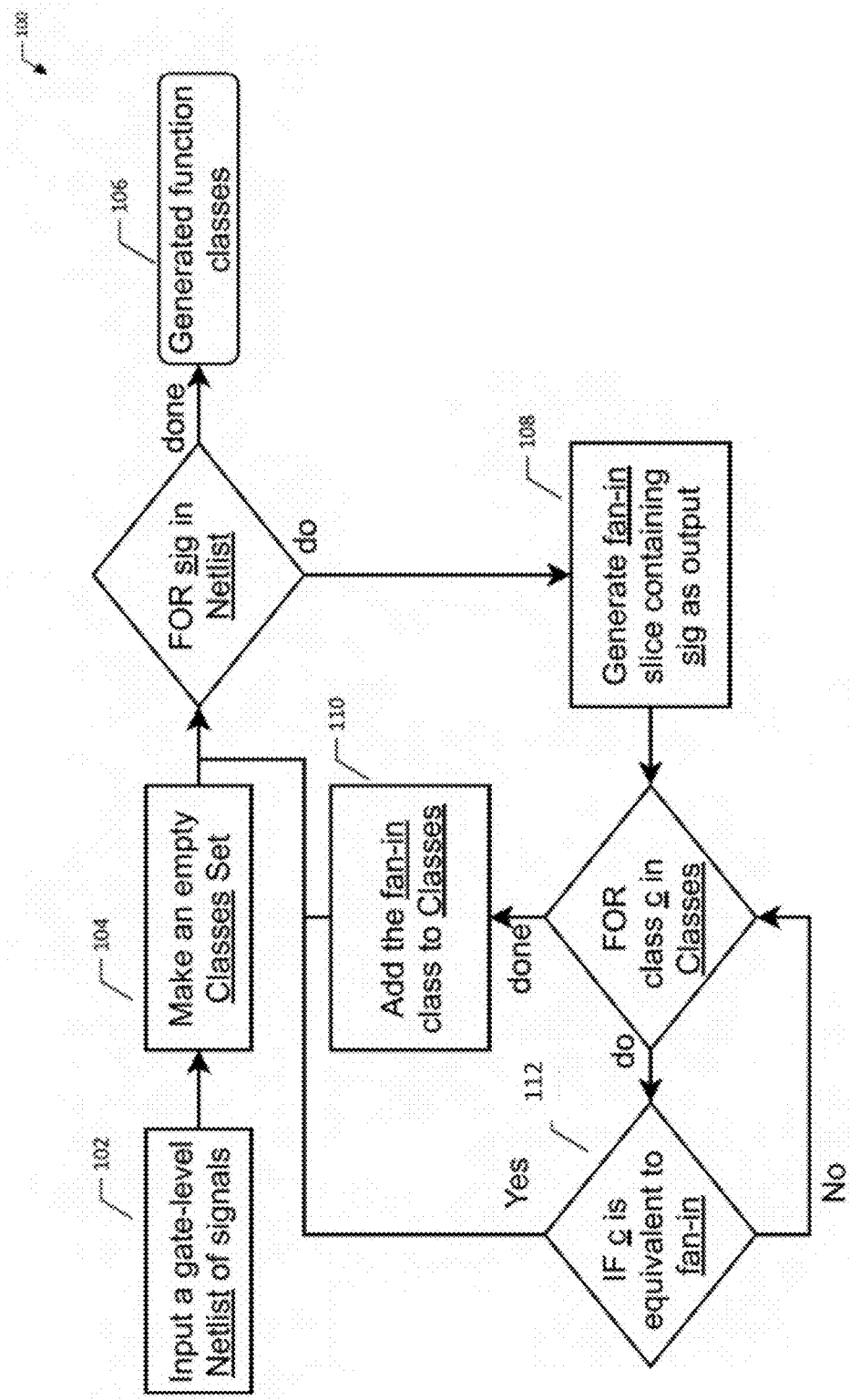
FIG. 1 provides a flowchart illustrating various processes, procedures, and/or operations for generating a list of equivalence classes for each possible truth table, according to various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments described herein relate to reverse engineering of integrated circuits for design verification. Increasingly complex IP design, coupled with shorter time-to-market (TTM) result in flaws at various levels of IC production. With access to IPs at all stages of production, design defects can be found and corrected. That is, knowledge of register transfer level (RTL) code enables easy defect detection. However, third-party Ips are typically delivered as hard IPs or gate-level netlists, which complicates the defect detection process. The inaccessibility of source RTL code and the lack of RTL recovery tools make the task of finding high-level security flaws in logic intractable.

According to various embodiments, a manufactured device (e.g., an integrated circuit) is disassembled to facilitate a high-level abstract description of functionality of the manufactured device. With conventional techniques for reverse engineering of integrated circuits, an image of the internal structure of an integrated circuit is obtained during the disassembly process of the integrated circuit. Furthermore, a transistor-level netlist to gate-level netlist is extracted from the image of the internal structure of the integrated circuit. In contrast, embodiments herein automatically generate Register Transfer Level (RTL) source code from a given gate-level netlist of design for an integrated circuit. According to various embodiments, an integrated circuit can include one or more semiconductor cores (e.g., one or more IP cores).

As disclosed herein, a netlist can be a description of connectivity for an integrated circuit (e.g., a semiconductor core). For example, a netlist can be formatted in a hardware description language to describe connectivity for an integrated circuit (e.g., a semiconductor core). Furthermore, as disclosed herein, RTL source code can model an integrated circuit (e.g., a semiconductor core) based on flow of signals between hardware components and/or logical operations associated with the signals. For example, a hardware description language can be employed to implement RTL source code which provides a high-level description of an integrated circuit (e.g., a semiconductor core).

In an embodiment, a series of algorithms and corresponding software can be employed to annotate and/or recover high-level descriptions in the form of RTL source code from a given gate-level netlist. According to various embodiments, the RTL source code can describe a state machine that controls data flow transitions and/or modifies one or more data paths. In certain embodiments, unspecified behavior associated with an integrated circuit and/or a semiconductor core can be detected. Additionally or alternatively, in certain embodiments, a finite state machine that was not originally intended to exist within a semiconductor core can be detected. In another embodiment, a series of algorithms and corresponding software can be employed to double check known designs for integrated circuits and/or semiconductor cores for potential flaws. In yet another embodiment, a series of algorithms and corresponding software can be employed to extract testing patterns to trigger certain logical states for integrated circuits and/or semiconductor cores.

In yet another embodiment, a high-level logical state machine can be extracted from a gate level netlist. Such high-level logical description can be in an RTL source code format to facilitate improved interpretation of the function of the design. It is to be appreciated that the techniques disclosed herein for reverse engineering of integrated circuits for design verification can be performed without whitelisted or blacklisted logical components. In contrast, the logic recovery process disclosed herein solely employs information of a gate-level netlist (e.g., a AND/OR/XOR/INVERTER gate-level netlist) to provide an interpretation of a design specification related to an integrated circuit and/or a semiconductor core. In certain embodiments, from the gate-level netlist, a graph describing signal interaction can be extracted and/or analyzed. Additionally, in certain embodiments, one or more RTL recovery tools can operate on such graph descriptions.

Exemplary Processes for Generating a List of Equivalence Classes for a Truth Table FIG. 1 depicts various processes for use with embodiments of the present disclosure. In various embodiments, a method 100 for generating a list of equivalence classes for each possible truth table is employed. The method 100 shown in FIG. 1 illustrates an embodiment to extract signals that have unique logical behavior. In an aspect, unique logical signals are employed since the data words have a high chance of emulating a similar logic between the various bits. Furthermore, identical functions imply that the bits of data belong to large equivalence classes. In an embodiment, a list of signals is stored for each found unique equivalence class. Furthermore, when a truth table for a signal is extracted, the truth table is checked by comparing the truth table against one or more other previously found unique truth tables. When a prior truth table is found to be identical to the truth table for the signal, the signal that produced the truth table is merged into the set of signals belonging to the truth table class. For instance, starting at block 102, a gate-level netlist of signals is input. At block 104, an empty classes set is made. The resulting generated function classes are provided at block 106. Furthermore, for each signal in the netlist, a fan-in slice containing the signal as output is generated at block 108. The method 100 also provides for adding the new fain-in class to the classes set at block 110. Furthermore, for each class c in the classes set, it is determined if class c is equivalent to fan-n at block 112. If yes, the method 100 returns to block 106 and/or block 108 for each signal in the netlist. If no, the method 100 returns to block 110 and/or block 112 to potentially add the new fan-in class to the classes set for each class c in the classes set.

As disclosed herein, an equivalence class of a set S is a subset E such that all members of E are considered equal by some equivalence relation. As disclosed herein, a partitioning of a set S places every member of S into exactly one equivalence class. As disclosed herein, a slice is a subset of the netlist, defined for a given signal Y which is the slice's output, with a set of captured input signals selected from the transitive fan-in of Y. A slice may compute a Boolean function $Y=f(A_1, A_2, \ldots, A_n)$; the inputs must totally determine Y. Meeting this condition requires that no gate contained in the slice has uncaptured, non-constant inputs. A slice of this form may be referred to as a feasible cut of the output Y, and a conforming slice of k inputs may be referred to as k-feasible.

Figure 2:
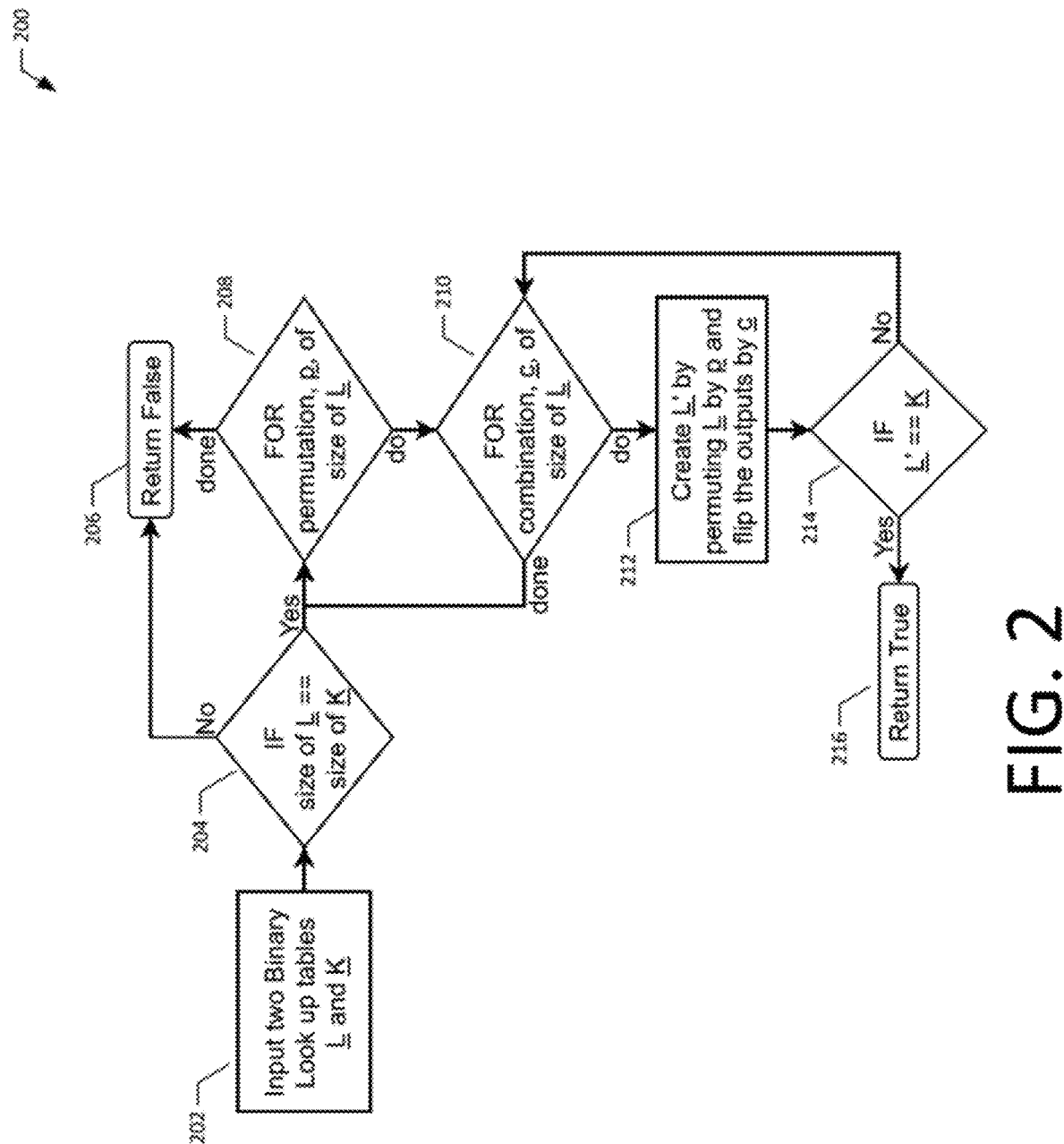
FIG. 2 provides a flowchart illustrating various processes, procedures, and/or operations for checking if two binary look-up tables are equivalent, according to various embodiments of the present disclosure.

Exemplary Processes for Determining whether Two Binary Look-up Tables are Equivalent FIG. 2 depicts various processes for use with embodiments of the present disclosure. In various embodiments, a method 200 for checking if two binary look-up tables are equivalent is employed. The method 200 shown in FIG. 2 illustrates an embodiment related to truth table comparison. In an aspect, to check if two signals have equivalent truth tables, the truth tables are compared by trying all permutations of input signal negations of only one of the tables. The permutation of inputs is tried, because it is unknown if the order of the fan-ins selected would necessarily be identical. Additionally, some of the inputs could be a negation of the correct higher-level signal for one of the selected fan-in structures, which can cause the table to be an inexact copy of the other. If a match is found, the tables can be considered to be identical. For instance, starting at block 202, two binary look-up tables L and K are input. At block 204, it is determined if the size of look-up table L is equal to the size of look-up table K. If no, a false indicator is returned at block 206. If yes, all permutations p of size of look-up table L are tried at block 208. Furthermore, all combinations c of size of look-up table L are tried at block 210. Furthermore, at block 212, a modified look-up table L' is created by permuting the look-up table L by permutations p and flipping the outputs by combinations c. At block 214, it is determined if the modified look-up table L' is equal to the look-up table K. If so, a true indicator is returned at block 216.

Figure 3:
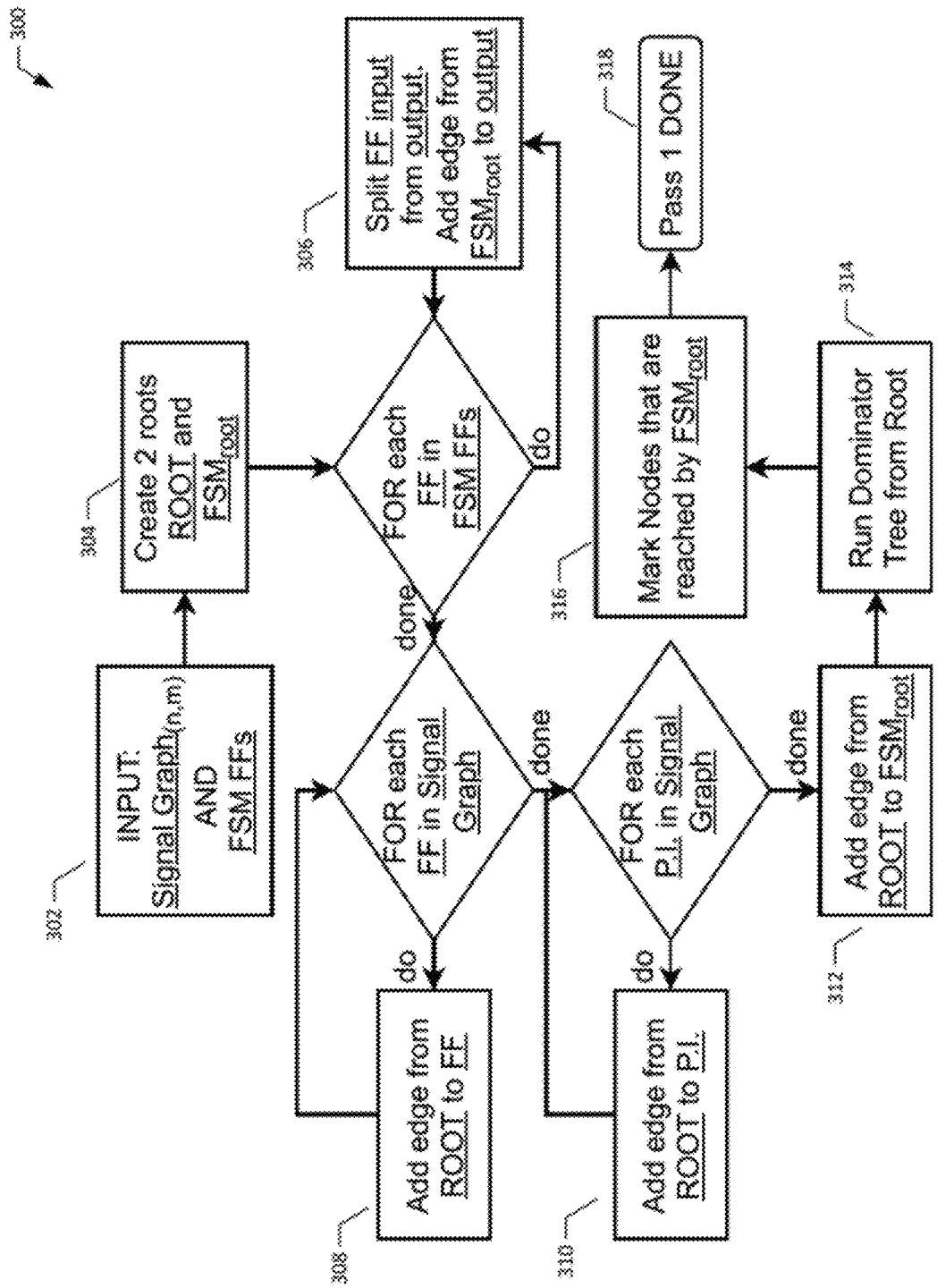
FIG. 3 provides a flowchart illustrating various processes, procedures, and/or operations for finding signals that are controlled entirely by a set of registers, according to various embodiments of the present disclosure.

Exemplary Processes for Finding Signals that are Controlled by a Set of Registers FIG. 3 depicts various processes for use with embodiments of the present disclosure. In various embodiments, a method 300 for finding signals that are controlled entirely by a set of registers is employed. The method 300 shown in FIG. 3 illustrates a process for finding signals that are controlled entirely by a set of registers. With the proper registers being selected, one or more recovery tools can be leveraged to extract the high-level function in the form of RTL source code. In an aspect, the output behavior of the logical state machine is determined. In certain embodiments, the output signals are found in three passes. The first pass detailed in FIG. 3 focuses on extracting all the signals whose logic is determined solely by the state registers. By identifying the signals contained by the fan-out of the state machines, signals that merge with non-fan-out controlled signals can be found to produce the modified signals, such as data controlled by states or inputs to other state machines. For instance, starting at block 302, a signal graph and flip-flops (FFs) for a finite state machine are input. At block 304, two roots ROOT and $FSM_{root}$ are created. Furthermore, for each flip-flop in the flip-flops for the finite state machine, the flip flop input is split from the output and an edge is added from $FSM_{root}$ to output at block 306. For each flip flop in the signal graph, an edge is added from ROOT to flip flop at block 308. Additionally, for each Primary Input (P.I.) in the signal graph, an edge is added from ROOT to P.I. at block 310. An edge is also added from ROOT to $FSM_{root}$ at block 312. At block 314, a dominator tree is run from ROOT. Furthermore, nodes that are connected to $FSM_{root}$ are marked at block 316. Then, at block 318, the first pass can end.

Figure 4:
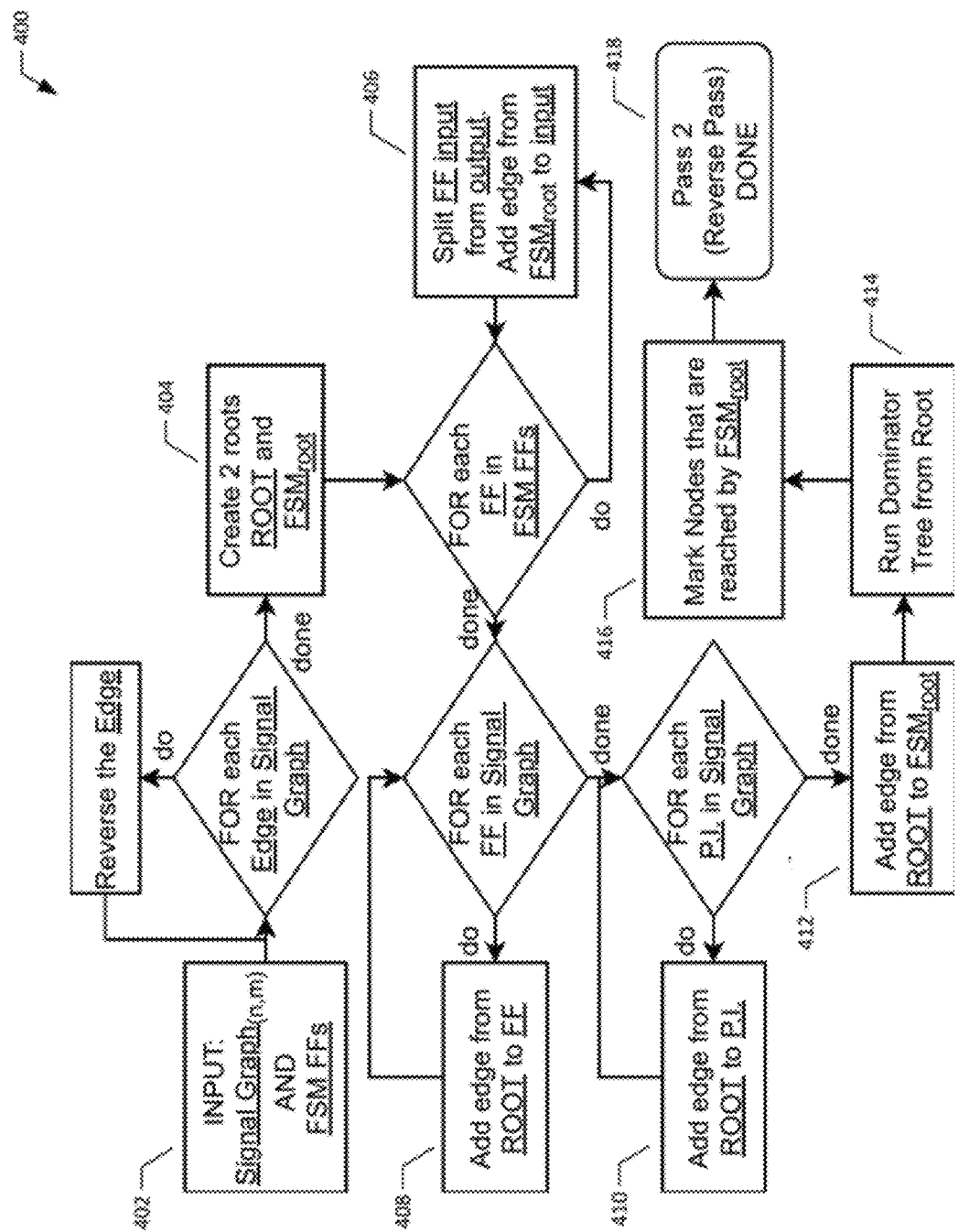
FIG. 4 provides a flowchart illustrating various processes, procedures, and/or operations for finding signals whose fan-out only affect a given list of registers, according to various embodiments of the present disclosure.

Exemplary Processes for Finding Signals Whose Fan-out Affect a Given List of Registers FIG. 4 depicts various processes for use with embodiments of the present disclosure. In various embodiments, a method 400 for finding signals whose fan-out only affect a given list of registers is employed. The method 400 shown in FIG. 4 illustrates a process for finding signals whose fan-out only affect a given list of registers. To prevent extracting output signals that are fed strictly back into the state machine, a second pass is detailed in FIG. 4 is employed to determine which signals have no effect on the output or other non-state machine registers. Both the forward pass and the backward pass in FIG. 3 and FIG. 4 can employ a linear time algorithm that extracts the dominator tree from the signal graph. The dominator tree can be employed, for example, to see which signals or groups of signals can maintain complete control over output behavior of other signals, regardless of other inputs or register signals. For instance, starting at block 402, a signal graph and flip-flops (FFs) for a finite state machine are input. For two roots ROOT and $FSM_{root}$ are created at 404. Furthermore, for each flip-flop in the flip-flops for the finite state machine, the flip flop input is split from the output and an edge is added from $FSM_{root}$ to the flip flop input at block 406. For each flip flop in the signal graph an edge is added flip flop at block 408. Additionally, for each Primary Output (P.O.) in the signal graph, an edge is added from ROOT to P.O. at block 410. An edge is also added from ROOT to $FSM_{root}$ at block 412. At block 414, a dominator tree is run from ROOT. Furthermore, nodes that are connected to $FSM_{root}$ in the dominator tree at block 414, are marked at block 416. Then, at block 418, the second pass can end.

Figure 5:
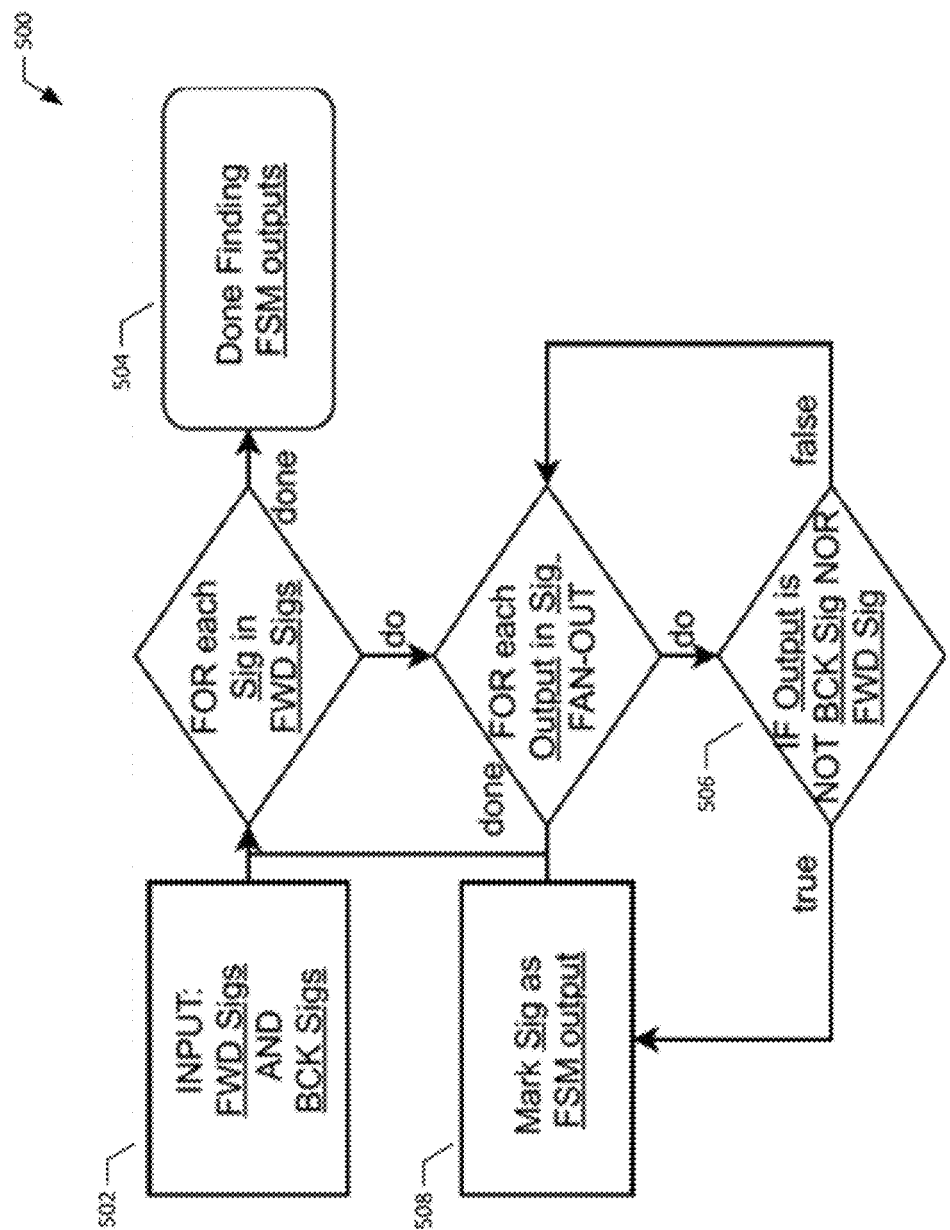
FIG. 5 provides a flowchart illustrating various processes, procedures, and/or operations for finding signals whose fan-out only affect a given list of registers, according to various embodiments of the present disclosure.

Exemplary Processes for Using Information of Signals related to a given List of Registers FIG. 5 depicts various processes for use with embodiments of the present disclosure. In various embodiments, a method 500 for finding signals whose fan-out only affects a given list of registers is employed. The method 500 shown in FIG. 5 illustrates how to use the information of signals reachable only by a given list of registers and signals able to reach the given list of registers to extract the output control signals for the registers. In an aspect, the result of two dominator trees is merged to produce the signals that are in effect leaving the state machine logic. In another aspect, it can be determined which signals have an output to non-state machine input signals in addition to being controlled by the state machine logic. In an embodiment, a Moore machine interpretation can be generated. In another embodiment, a Mealy machine interpretation can be generated. In certain embodiments, to convert from a Moore state machine to a Mealy state machine, modification to the forward signal domination algorithm illustrated in FIG. 3 can be performed. For example, instead of connecting the $FSM_{root}$ to just the registers, the $FSM_{root}$ can be to just connected to the primary input and the primary input can be disconnected from the ROOT. The method 500 can start at block 502, where forward signals and backward signals are input. For each signal in the forward signals and for each output in the signals fan-out, it is determined at block 506 if the output is not the backward signal nor the forward signal. If true, the signal is marked as finite state machine output at 508. If false, the block 506 can be repeated for each output in the signal fan out. In embodiment, the method 500 can be repeated for each signal in the forward signals and for each output in the signals fan-out until done finding finite state machine outputs at 504.

Exemplary Processes for Determining Logic Flow of a State Transducer

Figure 6:
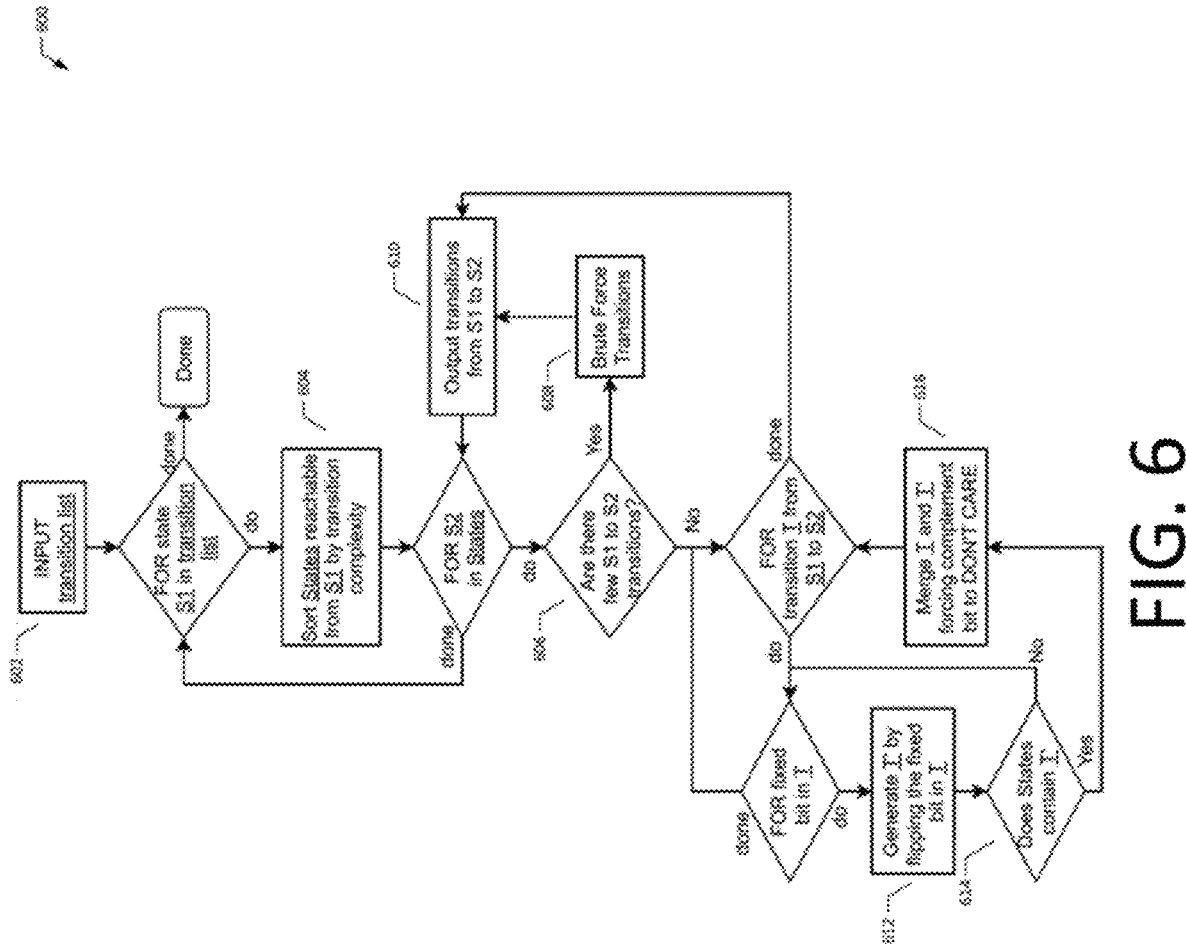
FIG. 6 provides a flowchart illustrating various processes, procedures, and/or operations for determining logic flow of a state transducer, according to various embodiments of the present disclosure.

FIG. 6 depicts various processes for use with embodiments of the present disclosure. In various embodiments, a method 600 for determining logic flow of a state transducer, a state machine with output information for each transition, is employed. The method 600 shown in FIG. 6 illustrates merging a list of transitions for a list of states into a compressed transition set describing logic flow of a state transducer. Once the transitions are extracted via Boolean satisfiability solving methods (e.g., SAT solving methods) using, for example, Reduced Ordered Binary Decision Diagrams (ROBDDs), the extraction to the RTL source code can begin. In an aspect, the transitions can be merged to form large conditionals. In another aspect, to facilitate interpretation of such conditionals, transitions that achieve the same functionality, but differ by a single bit in terms of transition conditions, can be merged. These mergers of the transitions can add up and allow for a simplified logic representation of a state transducer. When the transitions for some state pairs can no longer be merged, a standard logical behavior (e.g., a value in range condition) can be identified. Additionally or alternatively, an AND bit logic can be employed to define transitions. Modification of the transition compression as illustrated in FIG. 6 can provide for different interpretations as to what high-level description is generated. In certain embodiments, if-else conditions can be leveraged. For example, prior "used" transitions can be merged with current transitions to facilitate simplification of the logic into more general conditionals. The method 600 can start at block 602, where a transition list is input. For state S1 in the transition list, states reachable from S1 are sorted by transition complexity at block 604. Furthermore, for S2 in the sorted order of states, it is determined at block 606 if there are few S1 to S2 transitions. If yes, brute force of the transitions is performed at block 608. Furthermore, the resulting brute forced transitions from S1 to S2 are output at block 610. If no at block 608, for transition T from S1 to S2, and for a fixed bit in T, a modified transition T' is generated by flipping the fixed bit in transition T at block 612. At block 614, it is determined whether the states S1 and S2 contain the modified transition T'. If no, the method 600 returns to block 612 for a new fixed bit in transition T. If yes, the method 600 proceeds to block 616 to merge transition T and modified transition T' forcing complement bits to a "Don't Care" state. If no fixed bit allowed for a transition merger, the method 600 looks for a new transition T to merge for the given states, S1 and S2.

Exemplary Recovery Tools

Embodiments herein provide for hardware security by converting low-level circuit descriptions into higher level formats. Conventional methods have converted gate-level descriptions into an FSM, but depending on the auxiliary information presented with the FSM or even the structure of the FSM, determining the reliability of the netlist is still challenging. Embodiments herein overcome such shortcomings and more by enabling recovery of the netlist's logic in the form of a simplified snippet of RTL code with extra information pertaining to the signals controlled by the FSM. This enables easier interpretation of the RTL (e.g., as opposed to the FSM) either manually or by the use of an RTL analysis tool. Thus, retrieval of the RTL enables faster, more accurate fault detection as compared to the use of an FSM description. Furthermore, embodiments herein are capable of capturing the signals that can control the flow of data in the netlist.

In certain embodiments, one or more RTL recovery tools can be employed to leverage advanced graph algorithms to assist in netlist analysis. In an embodiment, a first RTL recovery tool can recover logical states and/or interactions of logical states from the initial design in the format of gate-level netlists. After the recovery of state interaction, the first RTL recovery tool further converts the full design into human-readable RTL. Furthermore, most current netlist reverse engineering tools rely on topological comparisons of logic in order to identify signals which are uniquely structured in the netlist, as these signals are likely control signals. However, topological comparisons become less effective when a netlist has been resynthesized and optimized. In another embodiment, a second RTL recovery tool can leverage netlist slicing and/or functional comparison of logic. As such, design of a semiconductor core (e.g., an IP core) can be recoverable at various complexities, with improved efficiency, and/or with a minimal amount of time for processing.

In an embodiment, the first RTL recovery tool can analyze gate-level netlists. Furthermore, the first RTL recovery tool can generate high-level RTL based on a gate-level netlist. In an aspect, the first RTL recovery tool can perform a preprocess to find all output signals of a finite state machine for a logical word. In another aspect, the first RTL recovery tool can recover the state and transition logic as well as the output signals evaluated at each state. In yet another aspect, the first RTL recovery tool can analyze transitions, reduce conditions, and/or produce the resulting RTL.

The first RTL recovery tool can additionally determine outputs of the finite state machine. For instance, in an embodiment, the first RTL recovery tool can determine which signals are most likely the output of the finite state machine. Additionally, in certain embodiments, the first RTL recovery tool can identify a subtree in a dominator tree.

FIG. 7 illustrates an example algorithm 800 related to a high-level implementation of output signal detection by leveraging dominator trees, according to various embodiments of the present disclosure. In an embodiment, an alternative graph can be generated based on the netlist where two extra roots are added, the main root and an FST root. The FST root can dominate every output and frontier output signal leaving the state registers. To extract the frontier, all dominated signals that are either netlist output signals or fan-out directly to a non-dominated signal can be determined. To do this, wires in a breadth first search (BFS) order can be analyzed starting at the FST root, and for each edge check if the next wire is no longer dominated. However, the algorithm illustrated in FIG. 7 can find false-positive output signals that only feedback into the state registers. Therefore, the entire algorithm can be executed again in parallel, except reversing the direction of all edges and moving the location of both roots to the outputs instead of the inputs. Doing this can allow elimination of signals that are completely dominated by the state registers in the reverse direction as seen on Lines 4, 6, 10, 13, 16, and 18 in example Algorithm 1 shown in FIG. 7.

Figure 8:
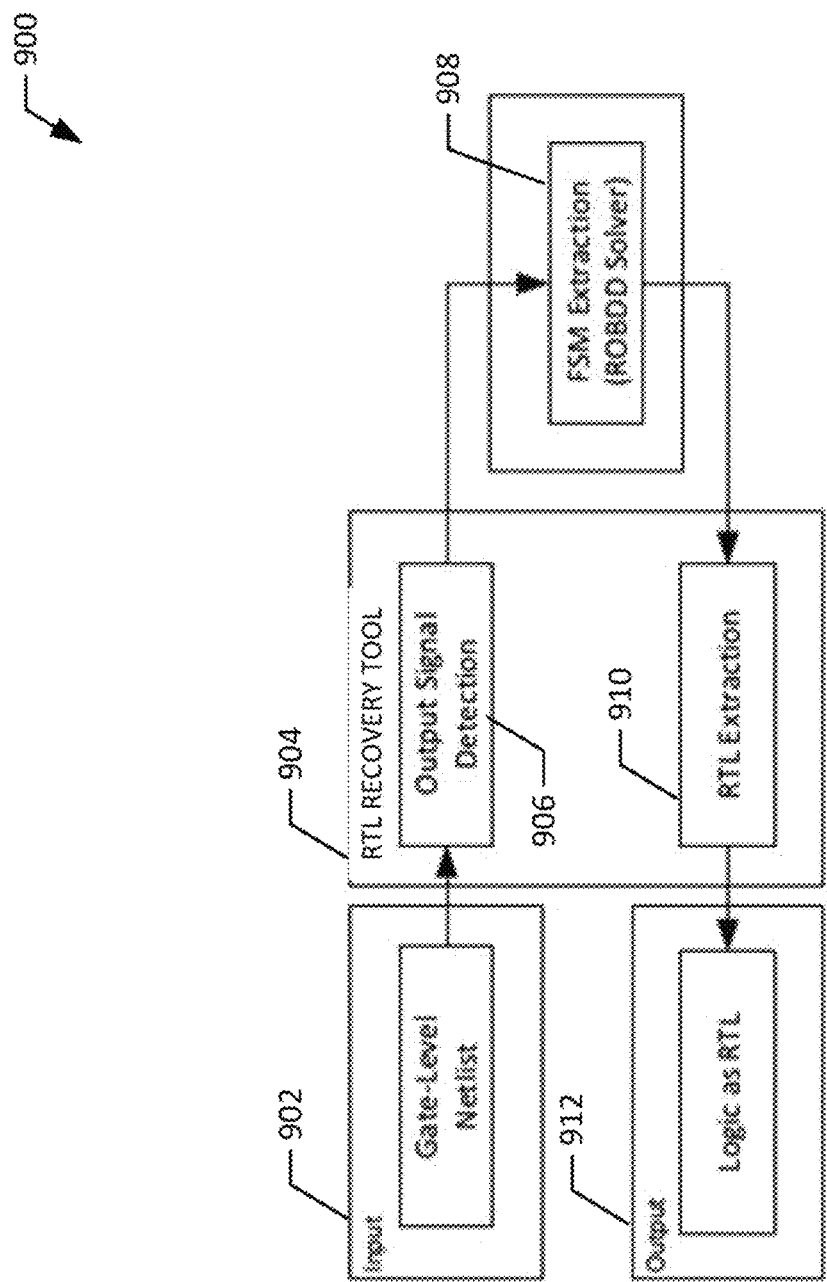
FIG. 8 illustrates a system related to a netlist reverse engineering flow with respect to an RTL recovery tool, according to various embodiments of the present disclosure.

FIG. 8 illustrates an example system 900 related to a netlist reverse engineering flow with respect to an RTL recovery tool, according to various embodiments of the present disclosure. In an embodiment, input 902 (e.g., a gate-level netlist) can be provided to an RTL recovery tool 904. In one example, the RTL recovery tool 904 can be the first RTL recovery tool. In an aspect, output signal detection 906 of the RTL recovery tool 904 can receive the input 902. Output of the output signal detection 906 can be provided to FSM extraction (ROBDD Solver) 908, which can provide output to RTL extraction 910 of the RTL recovery tool 904. The RTL extraction 910 can provide output 912 (e.g., logic as RTL). In an embodiment, a Reduced Ordered Binary Decision Diagram (ROBDD) solver (e.g., the FSM extraction (ROBDD Solver) 908) is leveraged to extract the raw FST from the netlist. Furthermore, the data can be transformed into a more human-readable format described in RTL code. Given the resulting transitions and a list of inputs, the RTL recovery tool 904 can generate high-level RTL that is equivalent to the recovered finite state machine. In an embodiment, the RTL code can include a header, a body and/or a reset logic. The header defines all the wires used for input, output, and states and how the states relate to the wires in the netlist. The body is used to define all the reachable states as well as the logic for each transition. The footer is used to define the reset state and apply the transition chosen in the body.

Figure 9:
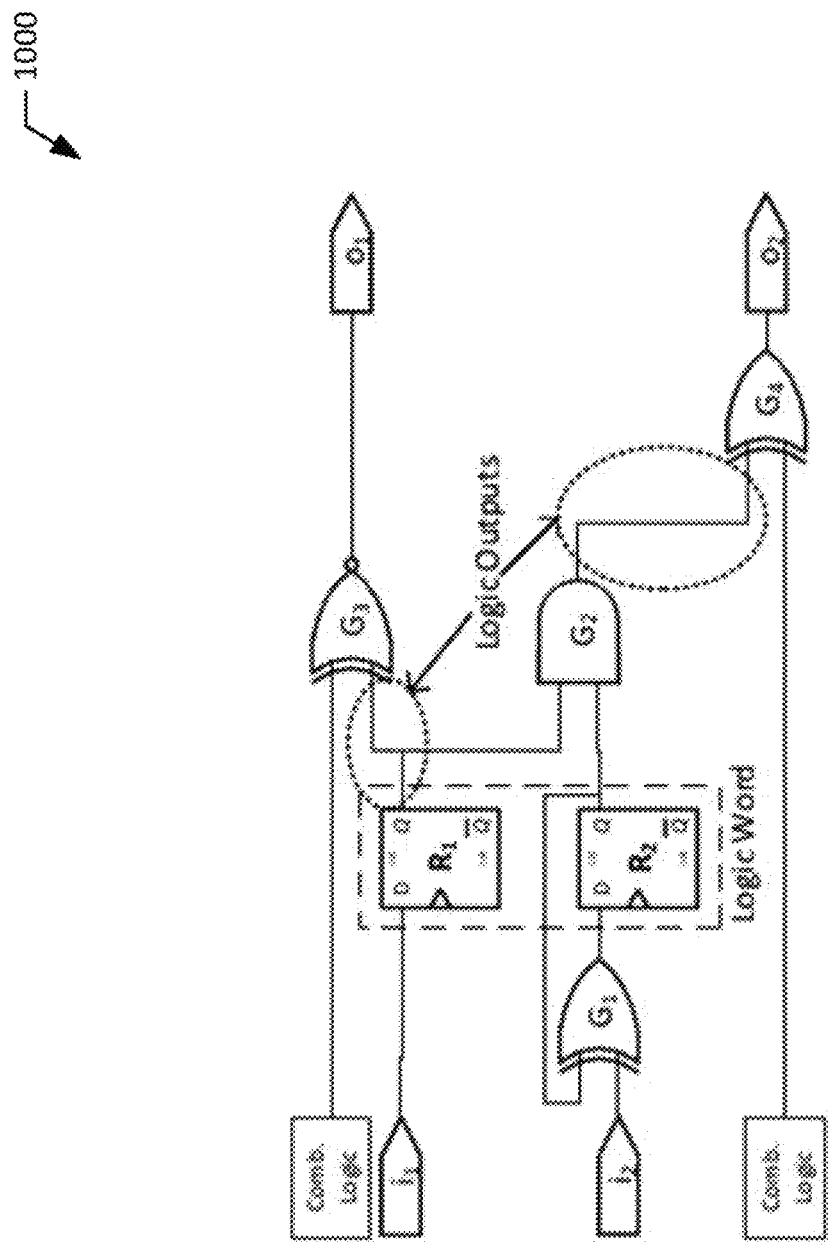
FIG. 9 illustrates a system that includes an example gate-level netlist with circled output signals, according to various embodiments of the present disclosure.

FIG. 9 illustrates a system 1000 that includes an example gate-level netlist with circled output signals, according to various embodiments of the present disclosure. For example, in the netlist shown in FIG. 9, a state transducer comprises two output signals affecting logic.

Figure 10:
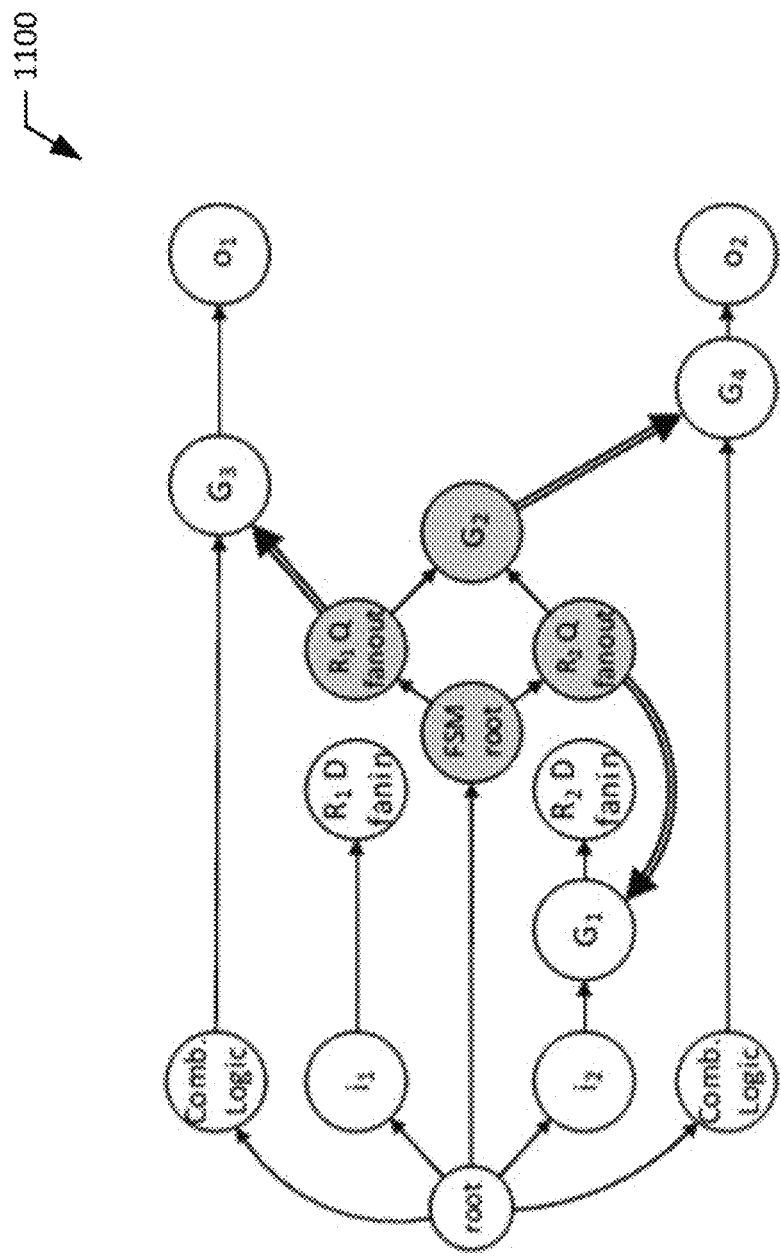
FIG. 10 illustrates a system that includes a forward graph, according to various embodiments of the present disclosure.

FIG. 10 illustrates a system 1100 that includes a forward graph, according to various embodiments of the present disclosure. In FIG. 10, the shaded nodes can be dominated by the FSM root. For example, the shaded nodes are directly or indirectly dominated by the FSM root. Furthermore, the double arrows can illustrate potential FMS output signals. For instance, all wires leaving the shaded nodes can be potential output signals of the FSM. In an embodiment, the system 1100 can be associated with a Lengauer-Tarj an's dominator tree algorithm. Additionally, as shown in FIG. 9, the wire leaving $R_2$ and entering Gi is contained entirely within the state machine.

Figure 11:
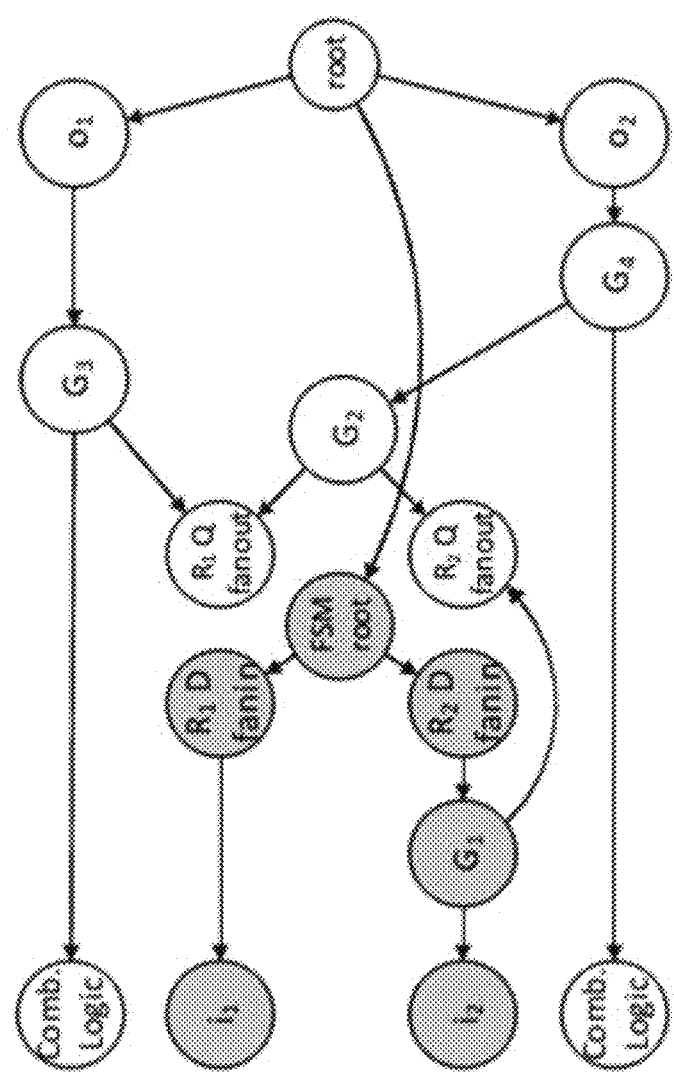
FIG. 11 illustrates a system that includes a reverse graph, according to various embodiments of the present disclosure.

FIG. 11 illustrates a system 1200 that includes a reverse graph, according to various embodiments of the present disclosure. In FIG. 11, the shaded nodes can be dominated by the FSM root. In an embodiment, the reverse graph illustrated in FIG. 11 can be employed to eliminate a signal that is dominated by the FST root in the reverse direction. In certain implementations, dominator tree usage can identity output of the second register as an output signal. However, due to the reverse graph check, the reverse graph can be employed to determine that only two signals, (e.g., Gate 2 and register 1) are actually logical output signals.

In certain embodiments, RTL code can be generated based on output wire reduction and/or generating conditions. In an embodiment, the first RTL recovery tool can analyze output of each state provided by high-level descriptions extracted from low-level netlists. In an embodiment, the first RTL recovery tool can generate conditions for each state transition. Given a single input word with n bits, there can be d "don't-care" bits and n-d bits critical to the state transition in a single transition. Furthermore, the input word can be prefixed in the least significant bits with p "don't-care" signals, where p is greater than or equal to d.

The following four cases are possible ways to describe a transition given by the ROBDD solver (e.g., the FSM extraction (ROBDD Solver) 908):

Case 1: d=0;
Case 2: d=p;
Case 3: A brute force method could compute $2^{d-p}$ in a reasonable time; and
Case 4: Brute force is not sufficient for an acceptable time constraint.

Case 1 is the trivial case where all of the bits are critical and defined in this transition. This can be represented as a simple equality check. In Case 2, p is important because all don't-care signals are a prefix of the input word and can be compressed to represent a single continuous range. In Case 3, these p bits can be removed and compressed in the same way. This allows use of brute force by checking all possible combinations of the remaining d-p bits and generate all ranges that satisfy this condition. In Case 4, the computational time for brute force would be too expensive. Moreover, the number of conditions would be too large to fit into one IF statement. Instead, bitwise AND logic can be employed to represent the transition very concisely. Once all of the transitions for a state are generated, transitions can be sorted by the number of conditions associated with a respective transition. As such complexity can be reduced and the if-elseif-else scheme of the transition can be employed.

In embodiments, a second RTL recovery tool may identify logic based on functional matching. In embodiments, the second RTL recovery tool may identify sections of a netlist that are not similar to many other sections of the netlist, as those identified sections may be more likely to be control signals.

Figure 12:
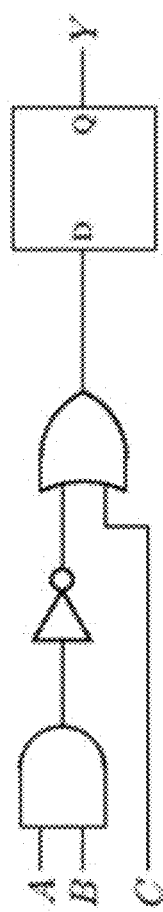
FIG. 12 illustrates a system that includes a 3-feasible slice, according to various embodiments of the present disclosure.

FIG. 12 illustrates a system 1300 that includes a 3-feasible slice that provides a signal Y, according to various embodiments of the present disclosure. The system 1300 includes an AND gate with inputs A and B. The system 1300 also includes an OR gate with an input C. In embodiments, if the AND gate had one more input, the slicing algorithm would have to include it, in order to satisfy the aforementioned requirement that all inputs of included gates must be captured. The algorithm could also just omit C, as that would leave the OR gate with one input dangling.

Figure 13:
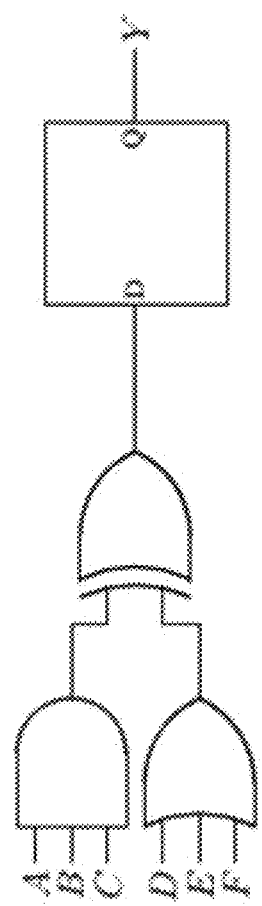
FIG. 13 illustrates a system that includes a circuit with multiple possible slices, according to various embodiments of the present disclosure.

FIG. 13 illustrates a system 1400 that includes a circuit with multiple possible slices that provides a signal Y, according to various embodiments of the present disclosure. With the system 1400, there are two 4-feasible cuts: A; B; C, and the second input to the XOR gate, or D; E; F, and the first input of the XOR gate. Furthermore, a 6-feasible cut uses all of A; B; C; D; E; F. In general, for any given k, there can be zero or more k-feasible cuts on a given signal.

TABLE 1

Two functionally equivalent truth tables

| A | B | C | X | Y |
|---|---|---|---|---|
| 0 | 0 | 0 | 0 | 0 |
| 0 | 0 | 1 | 1 | 1 |
| 0 | 1 | 0 | 0 | 0 |
| 0 | 1 | 1 | 1 | 0 |
| 1 | 0 | 0 | 1 | 1 |
| 1 | 0 | 1 | 0 | 0 |
| 1 | 1 | 0 | 0 | 1 |
| 1 | 1 | 1 | 1 | 1 |

Two slices can be functionally equal if they both compute the same Boolean function on the same set of inputs, potentially permuted in different ways. Table 1 above illustrates two functionally equivalent truth tables based on two circuits with outputs X and Y, respectively. Both circuits have the same inputs. In Table 1, assume ABC is input into circuit X and CBA is input into circuit Y; it can be seen that the outputs X and Y match for all inputs.

FIG. 14 illustrates an algorithm 1500 for computing equivalence classes, according to various embodiments of the present disclosure. In an aspect, the input signal is the set of interesting signals to classify. In one example, all signals that are register input can be the set of interesting signals to classify. For each signal, the algorithm 1500 determines a k-feasible cut for the signal by executing a breadth-first search (BFS) backwards from the signal into corresponding fan-in logic, constructing a set I of all gate inputs not totally interior to the slice. The search terminates once I contains k or more elements. As shown in FIG. 13, there is no guarantee that a k-feasible cut exists for a given signal. If there is no k-feasible cut for a signal, the algorithm 1500 will keep the next largest slice that is identified. For efficiency, the algorithm 1500 can store truth tables as 64-bit integers, where each bit is the result of assignment of one set of Boolean values to the inputs of the slice. If there are multiple slices for a given k, then the algorithm 1500 can keep only the first slice encountered. If the slice matches an existing class, then it is added to that class. Otherwise, a new class is created with the new slice as its only member. As mentioned above, the slicing algorithm may generate slices with a varying number of inputs, where each equivalence class only contains slices with the same number of inputs.

Figure 15:
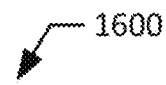
FIG. 15 illustrates an algorithm testing functional equality, according to various embodiments of the present disclosure.

FIG. 15 illustrates an algorithm 1600 for testing functional equality, according to various embodiments of the present disclosure. In an aspect, the algorithm 1600 compares two slices A and B by brute force enumeration of all possible input permutations. If A and B have different input sizes, then they are not equal. If the input sizes are the same, then the algorithm 1500 generates all permutations of a set of inputs of that size. For each permutation, A and B are computed for each possible set of input values. In an aspect, B is given the current permutation's reordering of the inputs given to A. If, for any permutation, A and B match on all possible inputs, then A and B are functionally equivalent. In certain embodiments, after the equivalence classes are built, the equivalence classes can be sorted by size. Classes with few members can be considered likely to be control logic as they compute functions dissimilar to the rest of the design. Classes with a large number of members, on the other hand, can be considered likely to contain data registers, as multi-bit register structures are very self-similar.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for reverse engineering of integrated circuits (ICs) for design verification, the method comprising:
    receiving a gate-level netlist for an integrated circuit (IC), wherein the gate-level netlist comprises a description of connectivity for the integrated circuit and is formatted in a hardware description language;
    generating, based at least in part on signals included in the gate-level netlist, a list of equivalence classes related to the signals;
    determining, based at least in part on the list of equivalence classes, control signals of the gate-level netlist;
    determining, based at least in part on the control signals, a logic flow of a finite state transducer (FST); and
    generating, based at least in part on the FST, register transfer level (RTL) source code for the IC, wherein the RTL source code models the IC based on one or more of flow of signals between hardware components of the IC or logical operations associated with the signals.

2. The method of claim 1, further comprising:
    extracting the control signals from the gate-level netlist of design using truth table equivalence classes.

3. The method of claim 2, further comprising:
    comparing the truth table equivalence classes for uniqueness.

4. The method of claim 2, further comprising:
    presenting signals for the truth table equivalence classes as the control signals.

5. The method of claim 1, wherein the generating the RTL source code comprises generating the RTL source code via Finite State Transducer (FST) extraction.

6. The method of claim 5, further comprising:
    identifying output signals of the FST using dominator trees.

7. An apparatus comprising at least one processor and at least one non-transitory storage medium storing instructions that, with the at least one processor, cause the apparatus to:
    receive a gate-level netlist for an integrated circuit (IC), wherein the gate-level netlist comprises a description of connectivity for the integrated circuit and is formatted in a hardware description language;
    generate, based at least in part on signals included in the gate-level netlist, a list of equivalence classes related to the signals;
    determine, based at least in part on the list of equivalence classes, control signals of the gate-level netlist;
    determine, based at least in part on the control signals, a logic flow of a finite state transducer (FST); and
    generate, based at least in part on the FST, register transfer level (RTL) source code for the IC, wherein the RTL source code models the IC based on one or more of flow of signals between hardware components of the IC or logical operations associated with the signals.

8. The apparatus of claim 7, wherein the at least one non-transitory storage medium stores instructions that, with the at least one processor, further cause the apparatus to:
    extract the control signals from the gate-level netlist of design using truth table equivalence classes.

9. The apparatus of claim 8, wherein the at least one non-transitory storage medium stores instructions that, with the at least one processor, further cause the apparatus to:
    compare the truth table equivalence classes for uniqueness.

10. The apparatus of claim 8, wherein the at least one non-transitory storage medium stores instructions that, with the at least one processor, further cause the apparatus to:
    present signals for the truth table equivalence classes as the control signals.

11. The apparatus of claim 7, wherein the generating the RTL source code comprises generating the RTL source code via Finite State Transducer (FST) extraction.

12. The apparatus of claim 11, wherein the at least one non-transitory storage medium stores instructions that, with the at least one processor, further cause the apparatus to:
    identify output signals of the FST using dominator trees.

13. A computer program product comprising at least one non-transitory computer-readable storage medium storing instructions that, when executed by at least one processor, cause an apparatus to:
    receive a gate-level netlist for an integrated circuit (IC), wherein the gate-level netlist comprises a description of connectivity for the integrated circuit and is formatted in a hardware description language;
    generate, based at least in part on signals included in the gate-level netlist, a list of equivalence classes related to the signals;
    determine, based at least in part on the list of equivalence classes, control signals of the gate-level netlist;
    determine, based at least in part on the control signals, a logic flow of a finite state transducer (FST); and
    generate, based at least in part on the FST, register transfer level (RTL) source code for the IC, wherein the RTL source code models the IC based on one or more of flow of signals between hardware components of the IC or logical operations associated with the signals.

14. The computer program product of claim 13, wherein the at least one non-transitory computer-readable storage medium stores instructions that, with the at least one processor, further cause the apparatus to:

extract the control signals from the gate-level netlist of design using truth table equivalence classes.

15. The computer program product of claim 14, wherein the at least one non-transitory computer-readable storage medium stores instructions that, with the at least one processor, further cause the apparatus to:
compare the truth table equivalence classes for uniqueness.

16. The computer program product of claim 14, wherein the at least one non-transitory computer-readable storage medium stores instructions that, with the at least one processor, further cause the apparatus to:
present signals for the truth table equivalence classes as the control signals.

17. The computer program product of claim 13, wherein the generating the RTL source code comprises generating the RTL source code via Finite State Transducer (FST) extraction.

18. The computer program product of claim 17, wherein the at least one non-transitory computer-readable storage medium stores instructions that, with the at least one processor, further cause the apparatus to:
identify output signals of the FST using dominator trees.

* * * * *

UNITED STATES PATENT AND TRADEMARK OFFICE
CERTIFICATE OF CORRECTION

PATENT NO. : 11,704,460 B2
APPLICATION NO. : 17/343231
DATED : July 18, 2023
INVENTOR(S) : Yier Jin It is certified that error appears in the above-identified patent and that said Letters Patent is hereby corrected as shown below:

On the Title Page

Item (73) should read:
--(73) Assignees: University Of Florida Research Foundation, Incorporated, Gainesville, FL (US); University Of Central Florida Research Foundation, Inc., Orlando, FL (US)--.

Signed and Sealed this
Fifteenth Day of August, 2023

*Katherine Kelly Vidal*

Katherine Kelly Vidal
*Director of the United States Patent and Trademark Office*